United States Patent [19]

Onga et al.

[11] Patent Number: 4,527,190
[45] Date of Patent: Jul. 2, 1985

[54] MIXING CIRCUIT

[75] Inventors: Makoto Onga, Fujisawa; Masatoshi Sase, Atsugi; Seisuke Yamanaka, Mitaka, all of Japan

[73] Assignee: Sony Corporation, Tokyo, Japan

[21] Appl. No.: 448,408

[22] Filed: Dec. 9, 1982

[30] Foreign Application Priority Data

Dec. 11, 1981 [JP] Japan ................................ 56-199858

[51] Int. Cl.³ .............................................. H04N 9/50
[52] U.S. Cl. .................................................... 358/30
[58] Field of Search ................... 358/21 R, 30, 37, 39, 358/40

[56] References Cited

U.S. PATENT DOCUMENTS 4,059,838 11/1977 Banker ................................... 358/30
4,183,050 1/1980 Tsuchiya ............................... 358/30

Primary Examiner—Michael A. Masinick
Attorney, Agent, or Firm—Lewis H. Eslinger; Alvin Sinderbrand

[57] ABSTRACT

A plurality of sampled signals that differ in phase by $2\pi/N$ (where N is an integer greater than 1) from one another are mixed by sequentially supplying the sampled signals to a holding circuit, the holding circuit output is buffered in a buffer amplifier to produce the system output having a beneficial high-frequency characteristic. Deterioration of the frequency characteristic of the synthesized output signal for a high frequency range due to a low-pass filter effect stemming from the zero hold in the sample/hold circuit is prevented by the mixing circuit.

9 Claims, 9 Drawing Figures

MIXING CIRCUIT

BACKGROUND OF THE INVENTION

Field of the Invention

This invention relates generally to a mixing circuit for mixing sampled signals and, more particularly, to a mixing circuit for mixing a plurality of sampled outputs that differ in phase by $2\pi/N$ from one another.

An image sensor consisting of a solid-state image sensor element, such as a charge coupled device (CCD), typically employs a scattered picture element structure. In such scattered picture element image sensor, the output signals corresponding to individual picture elements are first sampled before being processed to obtain the information contained therein. For example, a luminance signal can be formed from a color image output signal obtained from a solid-state color image sensor that is provided with a color coding filter, and the color signals are obtained by performing color separation on the color image signal that can be converted through a one horizontal scanning period (1H) delay circuit into a number of simultaneous signals, which are additively synthesized in predetermined proportions to obtain the luminance signal.

In the case of a color television signal of the NTSC (National Television System Committee) system, the luminance signal Y is defined by an equation $$Y = 0.11B + 0.59G + 0.30R \quad (1).$$

That is, the luminance signal Y can be obtained by additively synthesizing blue (B), green (G), and red (R) signals in the proportions of 0.11:0.59:0.30, respectively. Where luminance signal Y is formed from the color image output signal from a solid-state image sensor having a scattered picture element structure, it is known to remove the so-called turn-around distortion of side bands caused by sampling by forming a low frequency luminance component $Y_L$ given as $$Y_L = 0.11B + 0.59G + 0.30R \quad (2)$$

and high-frequency luminance component $Y_H$ given as $$Y_H = 0.5B + G + 0.5R \quad (3)$$

and combining these components $Y_L$ and $Y_H$ to obtain the luminance signal Y. For example, with a one-chip solid-state color image sensor that uses a mosaic color coding filter $C_F$, as shown in FIG. 1, having green filters $G_F$ arranged in a checkerboard-like fashion and red and blue filters $R_F$ and $B_F$ arranged in alternate horizontal lines between adjacent green filters $G_F$. A television signal according to the NTSC system and the above-described system can be formed with a signal processing circuit having a construction as shown in FIG. 2.

In FIG. 2, a solid-state color image sensor 1 is formed as an interline transfer type CCD provided with the color coding filter $C_F$, as described above. Solid-state color image sensor 1 provides a color image output signal at a clock frequency of $2f_c$. The color image output signal from image sensor 1 is coupled through buffer amplifier 2 to color separating circuit 3. Color separating circuit 3 consists of two sample/hold circuits 3A and 3B that are operated under the control of respective sampling clocks (not shown), which have a frequency $f_c$ and are 180 degrees, that is, $\pi$ radians, out of phase with each other. Sample/hold circuit 3A samples and holds the green signal G in the color image output signal from buffer amplifier 2. Another sample/hold circuit 3B samples and holds a red/blue signal R/B. A white balance control circuit 4 includes a fixed gain amplifier 4G for amplifying the green (G) signal, a variable gain amplifier 4R for amplifying the red (R) signal, and a variable gain amplifier 4B for amplifying the blue (B) signal. The white balance control is achieved by adjusting the gains of the variable gain amplifiers 4R and 4B, respectively, such that the red (R), green (G), and blue (B) signals are at an equal level. The green (G) and red/blue (R/B) signals, having been level adjusted in white balance control circuit 4, are coupled through respective gamma correction circuits 5A and 5B to a luminance signal forming circuit 10. Luminance signal forming circuit 10 includes first signal processing circuit 11 for effecting additive synthesis of its input signals in accordance with equation (2), second signal processing circuit 12 for effecting additive synthesis of its input signals in accordance with equation 3, low-pass filter 13 for receiving the synthesized output signal of first signal processing circuit 11, band-pass filter 14 for receiving the synthesized output signal of second signal processing circuit 12, and signal adder 15 for effecting additive syntheses of a low-frequency luminance signal $Y_L$ obtained from low-pass filter 13 and a high-frequency luminance signal $Y_H$ obtained from bandpass filter 14. Circuit 10 produces a luminance signal Y that is given by the equation $Y = Y_L + Y_H$. The three primary color signals red (R), green (G), and blue (B) having been gamma corrected in the conventional manner in gamma correction circuits 5A and 5B and the luminance signal Y formed by luminance signal synthesizing circuit 10 are supplied to color coder 8. Color coder 8 forms a composite video signal made up of the luminance signal, the green (G) signal, and the red/blue (R/B) signal in accordance with the NTSC system.

In luminance signal forming circuit 10, described above, second signal processing circuit 12 for forming the high-frequency luminance signal $Y_H$, has a construction as shown in FIG. 3. In signal processing circuit 20 shown in FIG. 3, the green (G) and red/blue (R/B) signals obtained through color separation of the color image signal from solid-state color image sensor 1 are converted to simultaneous signals through four delay circuits 32, 34, 42, and 44 each providing a delay time equal to one horizontal scanning period 1H. These simultaneous signals are weighted and added in first and second signal adders 51 and 52 to produce addition output signals $Y_{H1}$ and $Y_{H2}$, respectively. The addition output signals $Y_{H1}$ and $Y_{H2}$ are added together in third signal adder 53 to form the high-frequency luminance signal $Y_H$. The green (G) signal is supplied to a first signal input terminal 21 connected through first sample/hold circuit 31 to first 1H delay circuit 32 providing a one horizontal scanning period (1H) time delay. First 1H delay circuit 32 is connected through second sample/hold circuit 33 to second 1H delay circuit 34 also providing a time delay of one horizontal scanning period (1H). Second 1H delay circuit 34 is connected to third sample/hold circuit 35 providing a time delay of one horizontal scanning period. The red/blue (R/B) signal is supplied to second input signal terminal 22. As in the line for the green (G) signal described above, second signal input terminal 22 is connected through first sample/hold circuit 41, first 1H delay circuit 42 providing a time delay of one horizontal scanning period, second sample/hold circuit 43, second 1H delay circuit 44 providing a time delay of one horizontal period, and third sample/hold circuit 45. The output signals (R/B)$_0$ and (R/B)$_2$ from respective first and third sample/hold circuits 41 and 45 in the red/blue (R/B) signal line and the output signal G$_1$ from second sample/hold circuit 33 in the green (G) signal line are coupled through respective weighting circuits 46, 48, and 37 where they are weighted in proportions of 1(R/B)H0$_γ$:1(R/B)$_2$:2G$_1$. The weighted in proportions of 1 (R/B)H0$_γ$:1 (R/B)$_2$:2 G$_1$. The weighted signals in these proportions are fed to a first signal adder 51. The output signals G$_0$ and G$_2$ from first and third sample/hold circuits 31 and 35 in the green (G) signal line and the output (R/B)$_2$ from second sample/hold circuit 43 in the red/blue (R/B) signal line are weighted in respective weighting circuits 36, 38, and 47 in the proportions of 1G$_0$:1G$_2$:2(R/B)$_1$. These weighted signals are fed to second adder 52.

The sampling and holding operations of first and third sample/hold circuits 41 and 45 in the red/blue (R/B) signal line and second sample/hold circuit 33 in the green (G) signal line are done under the control of a clock signal $\phi_1$. The sampling and holding operation of second sample/hold circuit 43 of the red/blue (R/B) signal line and first and third sample/hold circuits 31 and 35 in the green (G) signal line are done under the control of a second clock signal $\phi_2$ that is 180 degrees, that is, radians, out of phase with the first clock signal $\phi_2$.

In signal processing circuit 20 of FIG. 3, sample/hold circuits 31, 33, and 35 and sample/hold circuits 41, 43, and 45 are controlled for zero hold by the respective clock signals $\phi_1$ and $\phi_2$ that are 180 degrees out of phase with each other, the transfer function H$_0$($\omega$) having a low-pass filter effect is expressed by an equation, $$H_0(\omega) = \frac{\sin\left(\frac{\omega T_c}{2}\right)}{\frac{\omega T_c}{2}} \quad (4)$$

where $f_c$ is the clock frequency and $T_c$ is the period, is applied to the first and second signal adders 51 and 52. This transfer function H$_0$($\omega$) has a frequency characteristic shown by the dashed curve in FIG. 4.

If the luminance signal Y is to be obtained from a frequency band using a sampling rate exceeding the Nyquist criteria, as in an image sensor apparatus making use of a solid-state color image sensor, the value of the transfer function H$_0$($\omega$) equals 0.9000 for $f=f_c/4'$ but it is reduced to 0.637 for $f=f_c/2$. For this reason, if signals Y$_{H1}$ and Y$_{H2}$ are added in the third signal adder 53, as noted above, deterioration of the frequency characteristic for a range of high-frequency values of the luminance signal Y results in reduction of the horizontal resolution, which is highly undesirable.

SUMMARY OF THE INVENTION

The present invention teaches a mixing circuit for additively synthesizing sampled signals that are obtained by sampling a plurality of input signals, wherein the sampling devices are under the control of sampling clock signals of different relative phases, and further wherein the sampled signals are sequentially supplied by appropriate switching to one holding circuit.

It is an object of the present invention to provide a mixing circuit that does not cause deterioration of the frequency characteristics of a high-frequency sampled signal.

It is another object of the present invention to provide a mixing circuit for mixing a plurality of input signals that are sampled with different relative phases, in which deterioration of the frequency characteristic of the resultant signal is improved by sequentially supplying the sampled signals, through suitable switching means to one hold circuit.

DETAILED DESCRIPTION OF PREFERRED EMBODIMENTS

Now, a preferred embodiment of the present invention will be described with reference to the drawings.

Figure 5:
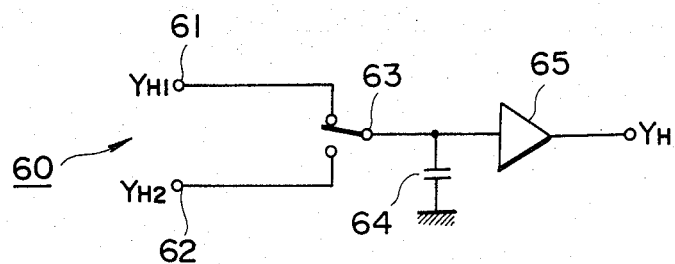
FIG. 5 is a circuit diagram showing a basic construction of a mixing circuit according to the present invention.

FIG. 5 shows a basic embodiment of sampled-signal mixing circuit 60 according to the present invention. Here, sampled output signals Y$_{H1}$ and Y$_{H2}$, which are 180 degrees out of phase with respect to each other, are switched through analog switch 63 to be supplied to common holding capacitor 64 that accomplishes the signal mixing. The operational principles of the circuit of FIG. 5 will be described hereinbelow, wherein the inventive circuit is used as third signal adder 53 in signal processing circuit 20 that is part of luminance signal forming circuit 10 described above.

Figures 1, 2:
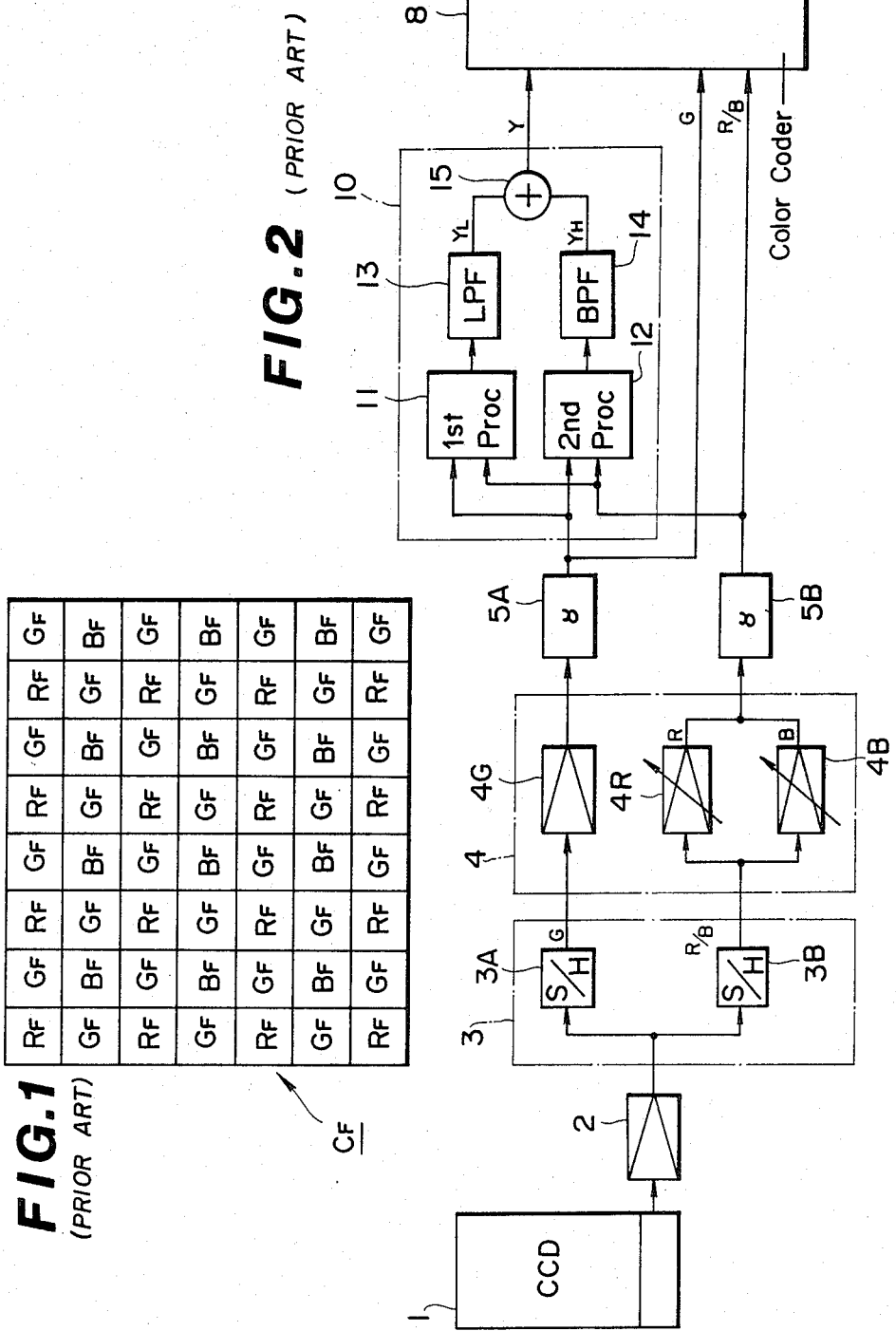
FIG. 1 is a plan view of a mosaic color coding filter for use with a solid-state image sensor.
FIG. 2 is a schematic in block diagram form of a prior art signal processing circuit for use with a solid-state color image sensor apparatus.
Figure 3:
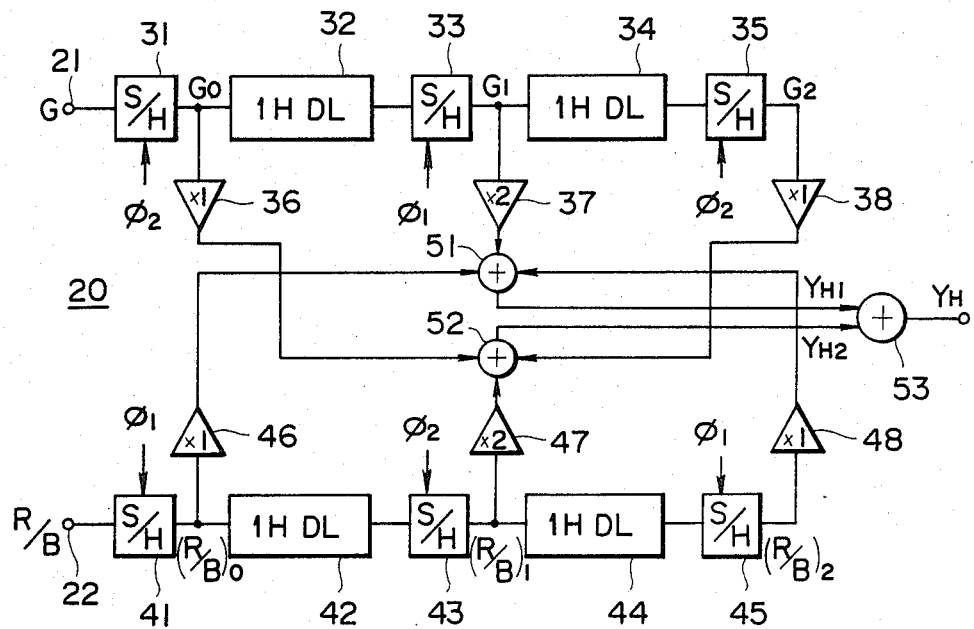
FIG. 3 is a schematic in block diagram form of a specific construction of a signal processing circuit for forming a high-frequency luminance signal in the signal processing circuit of FIG. 2.
Figure 6:
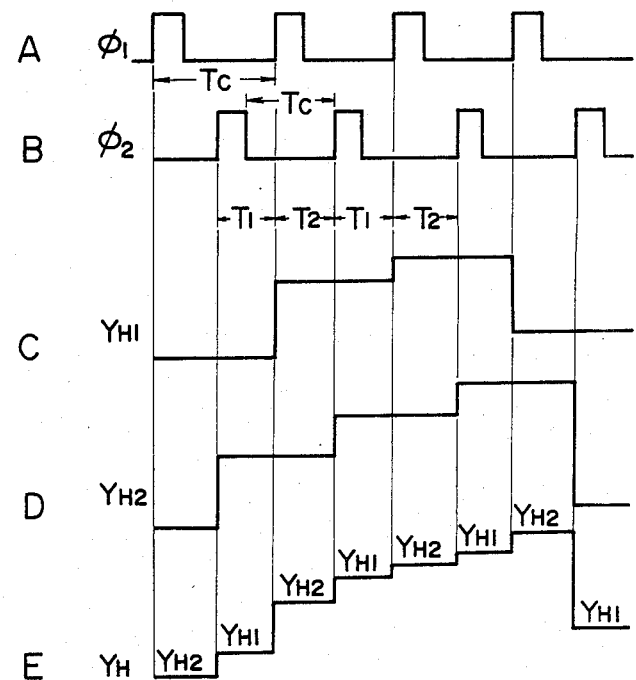
FIG. 6 is a time chart of certain of the signals of the apparatus of FIG. 3 for use in explaining the operating principles underlying the inventive mixing circuit of FIG. 5.

In the circuit of FIG. 5, output signals Y$_{H1}$ and Y$_{H2}$ from first and second signal adders 51 and 52 in signal processing circuit 20 of FIG. 3 are supplied to first and second signal input terminals 61 and 62, respectively. These output signals Y$_{H1}$ and Y$_{H2}$ are switched through analog switch 63 such that they are selectively supplied in periods T$_1$ and T$_2$, respectively, which together constitute the sampling period T$_c$, to holding capacitor 64. Since the signals Y$_{H1}$ and Y$_{H2}$ have been sampled and held under the control of the clock signals $\phi_1$ and $\phi_2$, which are 180 degrees out of phase with each other, as shown in waveforms A and B in FIG. 6, they have the waveforms C and D shown in FIG. 6. With periods $T_1$ and $T_2$ selected to be $T_1 = T_2 = T_c/2$ and with the signals $Y_{H1}$ and $Y_{H2}$ switched through analog switch 63, such that the signal $Y_{H1}$ having been sampled under the control of the clock signal $\phi_1$ is supplied to holding capacitor 64 for the period $T_1$ synchronized to the other clock signal $\phi_2$, and the other signal $Y_{H2}$ having been sampled under the control of the other clock signal $\phi_2$ is supplied to holding capacitor 64 for the period $T_2$ synchronized to the clock signal $\phi_1$, a luminance signal $Y_H$, as shown in E in FIG. 6, can be obtained. In FIG. 5, an output buffer amplifier 65 is shown, whereby it is possible to obtain a mixing operation that is substantially equivalent to the zero hold effected at a clock frequency of $2f_c$ and with a period of $T_c/2$. Thus, the transfer function $H_D(\omega)$, which has a low-pass filter effect in relation to the resultant luminance signal $Y_H$, can be expressed as $$H_D(\omega) = \frac{\sin\left(\frac{\omega T_c}{4}\right)}{\frac{\omega T_c}{4}} \tag{5}$$

Figure 4:
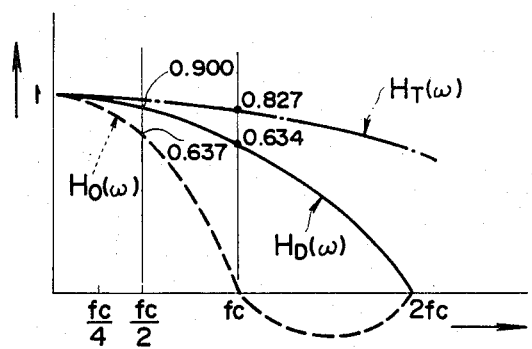
FIG. 4 is a graph showing frequency characteristics of the transfer function for the circuit of FIG. 3 for high-frequency luminance signals.

The frequency characteristic of this transfer function $H_D(\omega)$ is shown by the solid curve in FIG. 4. In the case of the prior art mixing operation, wherein the level is reduced to $H_D(\omega) = 0.637$ for $f = f_c/2$, as shown in FIG. 4, with the signal mixing circuit according to the present invention, the level obtainable for the same frequency $f = f_c/2$ is $H_D(\omega) = 0.900$. In other words, it is possible to improve significantly the high-frequency characteristic of the luminance signal Y.

Figure 7:
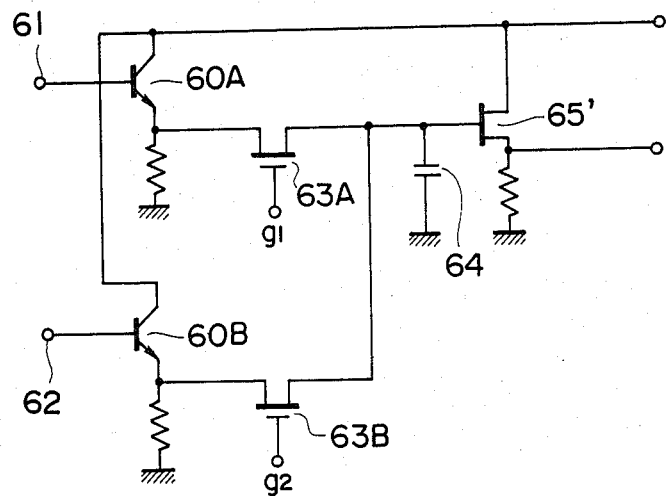
FIG. 7 is a circuit diagram of an embodiment of the inventive mixing circuit of FIG. 5.

FIG. 7 shows a specific circuit construction of signal mixing circuit 60, which was shown in its basic form in FIG. 5. In FIG. 7, circuit 60 includes input buffer transistors 60A and 60B, with the $Y_{H1}$ and $Y_{H2}$ luminance component signals applied to the respective base leads through terminals 61 and 62, respectively, output buffer transistor 65', and switching transistors 63A and 63B constituting analog switch 63 of FIG. 5. The mixing operation as described above is effected in holding capacitor 64 under the control of gate signals $g_1$ and $g_2$, which have respective pulse widths $T_1$ and $T_2$ and a repetition period $T_c$, and are supplied to the gate input leads of the respective switching transistors 63A and 63B.

Figure 8:
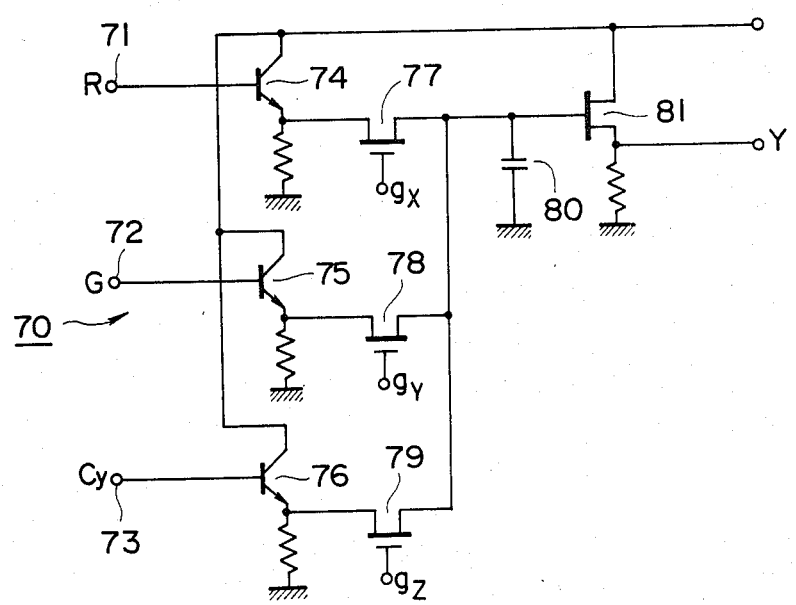
FIG. 8 is a circuit diagram showing an embodiment of the present invention for use in mixing three sampled signals.
Figure 9:
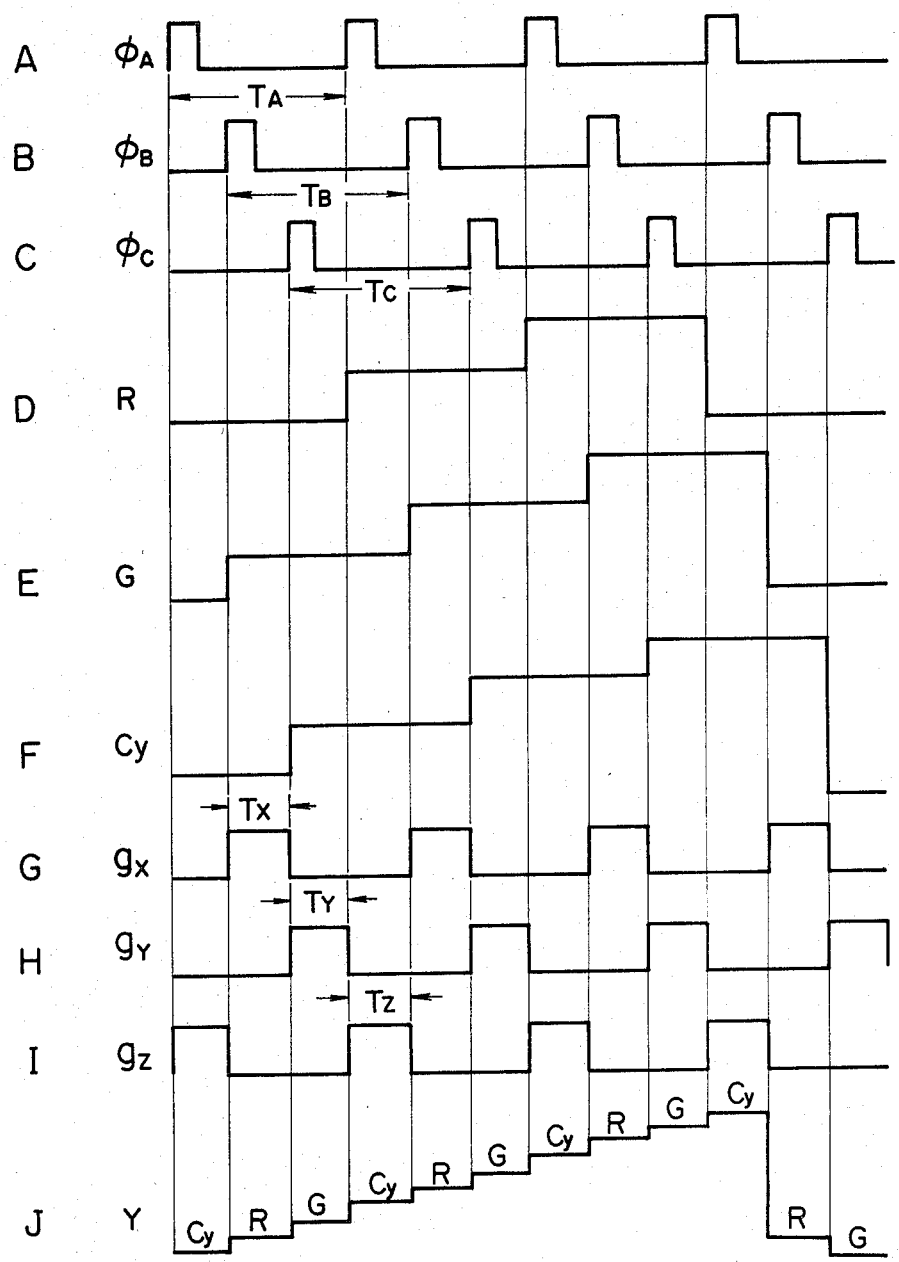
FIG. 9 is a timing chart of certain of the signals of the apparatus of FIG. 8 for use in explaining the operation of the embodiment of FIG. 8.

FIG. 8 shows a different embodiment of the invention. In this embodiment, sampled signals that are $\frac{2}{3}$ radians out of phase with one another are mixed together, as in the case of forming luminance signal Y by mixing together color signals red (R), green (G), and cyan ($C_y$) obtained through color disassembly (subtractive color) of a color image output of a frame transfer type charge coupled device (CCD) image sensor provided with color filters for red (R), green (G) and cyan ($C_y$) arranged in vertical stripes on the face of the image sensor. In this embodiment, red (R), green (G), and cyan ($C_y$) signals shown at D, E, and F in FIG. 9, respectively, which are obtained by color disassembly under the control of clock signals $\phi_A$, $\phi_B$, and $\phi_C$, which are $\frac{2}{3}$ radians out of phase with respect to one another, as shown in A, B and C in FIG. 9, are supplied to first, second, and third signal input terminals 71, 72, and 73, respectively. The red (R), green (G), and cyan ($C_y$) signals are coupled through input buffer transistors 74, 75, and 76 to switching transistors 77, 78, and 79 to accomplish analog switching so that the color signals are selectively supplied to holding capacitor 80. First switching transistor 77 operates under the control of a gate signal $g_x$, as shown in waveform G in FIG. 9, synchronized to the sampling clock signal $\phi_A$ for the green (G) signal to holding capacitor 80 during the period $T_X$. Second switching transistor 78 operates under the control of a gate signal $g_y$, as shown in waveform H in FIG. 9, synchronized to the sampling clock signal $\phi_B$ for the cyan ($C_Y$) signal and having a pulse width $T_Y$, and also supplies the green (G) signal to holding capacitor 80 during the period $T_Y$. Third switching transistor 79 operates under the control of a gate signal $g_z$, as shown in waveform I in FIG. 9, that is synchronized to the sampling clock signal $\phi_C$ for the red (R) signal, has a pulse width $T_Z$, and also supplies the red (R) signal to holding capacitor 80 during the period $T_Z$. The pulse periods $T_X$, $T_Y$, and $T_Z$ of the gate signals $g_x$, $g_y$, and $g_z$ are set to be equal to one-third of the period $T_C$ of the clock signals $\phi_A$, $\phi_B$ and $\phi_C$ respectively. From holding capacitor 80, to which the red (R), green (G) and cyan ($C_Y$) signals are supplied by switching transistors 77, 78, and 79, a luminance signal Y, as shown in waveform J in FIG. 9, can be obtained through output buffer transistor 81.

The transfer function $H_T(\omega)$ given to the luminance signal Y in this embodiment can be expressed as $$H_T(\omega) = \frac{\sin\left(\frac{\omega T_c}{6}\right)}{\frac{\omega T_c}{6}} \tag{6}$$

In this embodiment, the transfer function $H_T(\omega)$ has a frequency characteristic as shown by a dot-and-bar curve in FIG. 4. The level for $f = f_c/2$ is $H_T(\omega) = 0.955$, a further improvement of the high-frequency characteristic of the luminance signal Y.

In general, the present invention can be applied to the mixing of a plurality of sampled signals wherein the sampling was controlled by signals having a phase difference of $2\pi/N$ (N being an integer greater than 1, i.e., N = 2, 3, ...). The sampled outputs may be sequentially supplied through an N-contact analog switch circuit to a common holding capacitor for mixing.

What is claimed is:

1. A mixing circuit for combining at least two input signals into a synthesized signal, comprising:
   sampling means receiving said at least two input signals for producing corresponding sampled input signals;
   switch means receiving said at least two sampled input signals for sequentially supplying said two sampled input signals;
   holding means receiving said sampled input signals supplied sequentially by said switch means for producing an additive signal therefrom; and
   buffer amplifier means having an input connected to said holding means for producing a buffered added output signal based on said at least two input signals.

2. The mixing circuit according to claim 1, further comprising clock signal means for controlling said sampling means; and wherein said sampling means includes individual sampling circuits for said at least two input signals, respectively, and which are under the control of sampling clock signals of different phases with respect to one another produced by said clock signal means.

3. The mixing circuit according to claim 2, wherein the phases of said sampling clock signals differ by $2\pi/N$ from one another, with N being the number of sampling circuits.

4. The mixing circuit according to claim 2, wherein said switch means includes at least two transistor switches connected between said sampling means and said holding means, said transistor switches being on-off operated in different phases with respect to one another to sequentially supply said at least two input signals to said holding means.

5. The mixing circuit according to claim 2, wherein said sampling circuits also serve as a switch circuit.

6. The mixing circuit according to claim 4, wherein the operation of said transistors is controlled by control signals ($g_1$, $g_2$) related to said sampling clock signals.

7. The mixing circuit according to claim 1, wherein said holding means is a hold capacitor.

8. The mixing circuit according to claim 1, wherein transfer function $H_D(\omega)$ relative to said at least two sampled input signals and said buffered added output signal is expressed as $$H_D(\omega) = \frac{\sin\left(\frac{\omega Tc}{2N}\right)}{\frac{\omega Tc}{2N}}$$

where N is the number of sampled input signals and Tc is the sampling period.

9. The mixing circuit according to claim 1, wherein said at least two signals are high frequency and low frequency luminance components $Y_H$ and $Y_L$ of a video signal.

* * * * *